(12) United States Patent
Sistla et al.

(10) Patent No.: US 10,372,197 B2
(45) Date of Patent: *Aug. 6, 2019

(54) USER LEVEL CONTROL OF POWER MANAGEMENT POLICIES

(71) Applicant: Intel Corporation, Santa Clara, CA (US)

(72) Inventors: Krishnakanth V. Sistla, Beaverton, OR (US); Jeremy Shrall, Portland, OR (US); Stephen H. Gunther, Beaverton, OR (US); Efraim Rotem, Haifa (IL); Alon Naveh, Ramat Hasharon (IL); Eliezer Weissmann, Haifa (IL); Anil Aggarwal, Portland, OR (US); Martin T. Rowland, Beaverton, OR (US); Ankush Varma, Hillsboro, OR (US); Ian M. Steiner, Hillsboro, OR (US); Matthew Bace, North Andover, MA (US); Avinash N. Ananthakrishnan, Hillsboro, OR (US); Jason Brandt, Austin, TX (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/367,330

(22) Filed: Dec. 2, 2016

(65) Prior Publication Data

US 2017/0083076 A1    Mar. 23, 2017

Related U.S. Application Data

(63) Continuation of application No. 14/855,553, filed on Sep. 16, 2015, now Pat. No. 9,535,487, which is a
(Continued)

(51) Int. Cl.
*G06F 1/26* (2006.01)
*G06F 1/3234* (2019.01)
(Continued)

(52) U.S. Cl.
CPC ............ *G06F 1/3275* (2013.01); *G06F 1/266* (2013.01); *G06F 1/3203* (2013.01); *G06F 1/3206* (2013.01); *G06F 1/3234* (2013.01)

(58) Field of Classification Search
CPC ...... G06F 1/266; G06F 1/3203; G06F 1/3206; G06F 1/3234; G06F 1/3275
See application file for complete search history.

(56) References Cited

U.S. PATENT DOCUMENTS

| 5,163,153 A | 11/1992 | Cole et al. |
| 5,522,087 A | 5/1996 | Hsiang |

(Continued)

FOREIGN PATENT DOCUMENTS

| CN | 1728023 | 2/2006 |
| EP | 1 282 030 A1 | 5/2003 |

(Continued)

OTHER PUBLICATIONS

U.S. Appl. No. 12/889,121, "Providing Per Core Voltage and Frequency Control," filed Sep. 23, 2010, by Pakaj Kumar.
(Continued)

*Primary Examiner* — Abdelmoniem I Elamin
(74) *Attorney, Agent, or Firm* — Trop, Pruner & Hu, P.C.

(57) ABSTRACT

In one embodiment, the present invention includes a processor having a core and a power controller to control power management features of the processor. The power controller can receive an energy performance bias (EPB) value from the core and access a power-performance tuning table based on the value. Using information from the table, at least one
(Continued)

setting of a power management feature can be updated. Other embodiments are described and claimed.

20 Claims, 8 Drawing Sheets

Related U.S. Application Data continuation of application No. 13/782,473, filed on Mar. 1, 2013, now Pat. No. 9,170,624, which is a continuation of application No. 13/326,586, filed on Dec. 15, 2011, now Pat. No. 9,098,261.

(51) Int. Cl.
*G06F 1/3203* (2019.01)
*G06F 1/3206* (2019.01)
*G06F 1/32* (2019.01)

(56) References Cited

U.S. PATENT DOCUMENTS

| | | | |
|---|---|---|---|
| 5,590,341 A | 12/1996 | Matter | |
| 5,621,250 A | 4/1997 | Kim | |
| 5,931,950 A | 8/1999 | Hsu | |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 71,111,179 | 9/2006 | Girson et al. | |
| 7,194,643 B2 | 3/2007 | Gonzalez et al. | |
| 7,272,730 B1 | 9/2007 | Acquaviva et al. | |
| 7,376,849 B2 | 5/2008 | Tschanz et al. | |
| 7,412,616 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 8,245,070 B2* | 8/2012 | Finkelstein | G06F 1/3203 713/322 |
| 8,301,742 B2 | 10/2012 | Hanson et al. | |
| 8,904,205 B2* | 12/2014 | Burns | G06F 1/26 713/300 |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0068206 A1 | 3/2005 | Beers et al. | |
| 2005/0132238 A1 | 6/2005 | Nanja | |
| 2006/0050670 A1 | 3/2006 | Hillyard et al. | |
| 2006/0059286 A1 | 3/2006 | Bertone et al. | |
| 2006/0063326 A1 | 3/2006 | Naveh | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0260260 A1 | 10/2008 | Tomita | |
| 2008/0288894 A1 | 11/2008 | Han et al. | |
| 2008/0289369 A1 | 11/2008 | Noguchi | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0177334 A1 | 7/2009 | Artman et al. | |
| 2009/0235105 A1 | 9/2009 | Branover et al. | |
| 2009/0254660 A1* | 10/2009 | Hanson | H04L 12/10 709/226 |
| 2009/0327785 A1 | 12/2009 | Chang et al. | |
| 2010/0115309 A1 | 5/2010 | Carvalho et al. | |
| 2010/0146513 A1 | 6/2010 | Song | |
| 2010/0169609 A1* | 7/2010 | Finkelstein | G06F 1/3203 712/43 |
| 2010/0191997 A1 | 7/2010 | Dodeja et al. | |
| 2010/0199280 A1* | 8/2010 | Vestal | G06F 9/4881 718/102 |
| 2010/0218029 A1 | 8/2010 | Floyd et al. | |
| 2011/0154090 A1 | 6/2011 | Dixon et al. | |
| 2011/0296212 A1 | 12/2011 | Elnozahy et al. | |
| 2013/0179706 A1 | 7/2013 | Sistla et al. | |

FOREIGN PATENT DOCUMENTS

| | | |
|---|---|---|
| TW | 200301025 A | 1/2006 |
| TW | 201001157 A | 1/2010 |

OTHER PUBLICATIONS

SPEC-Power and Performance, Design Overview V1.10, Standard Performance Information Corp., Oct. 21, 2008, 6 pages.
U.S. Appl. No. 13/070,700, "Obtaining Power Profile Information With Low Overhead," filed Mar. 24, 2011, by Robert Knight.
Anoop Iyer, et al., "Power and Performance Evaluation of Globally Asynchronous Locally Synchronous Processors," 2002, pp. 1-11.
Greg Semeraro, et al., "Hiding Synchronization Delays In A GALS Processor Microarchitecture," 2004, pp. 1-13.
Joan-Manuel Parcerisa, et al., "Efficient All References Considered Interconnects for Clustered Microarchitectures," 2002, pp. 1-10.
Grigorios Magklis, et al., "Profile-Based Dynamic Voltage and Frequency Scalling for a Multiple Clock Domain Microprocessor," 2003, pp. 1-12.
Greg Semeraro, et al., "Dynamic Frequency and Voltage Control for a Multiple Clock Domain Architecture," 2002, pp. 1-12.
Greg Semeraro, "Energy-Efficient Processor Design Using Multiple Clock Domains with Dynamic Voltage and Frequency Scaling," 2002, pp. 29-40.
Diana Marculescu, "Application Adaptive Energy Efficient Clustered Architectures," 2004, pp. 344-349.
L. Benini, et al., "System-Level Dynamic Power Management," 1999, pp. 23-31.
Ravindra Jejurikar, et al., "Leakage Aware Dynamic Voltage Scaling for Real-Time Embedded Systems," 2004, pp. 275-280.
Ravindra Jejurikar, et al., "Dynamic Slack Reclamation With Procrastination Scheduling In Real-Time Embedded Systems," 2005, pp. 13-17.
R. Todling, et al., "Some Strategies for Kalman Filtering and Smoothing," 1996, pp. 1-21.
R.E. Kalman, "A New Approach to Linear Filtering and Prediction Problems," 1960, pp. 1-12.
Intel Technology Journal, "Power and Thermal Management in the Intel Core Duo Processor," May 16, 2006, pp. 109-122.
Intel Developer Forum, IDF2010, Opher Kahn, et al., "Intel Next Generation Microarchitecture Codename Sandy Bridge: New Processor Innovations," Sep. 13, 2010, 56 pages.
International Searching Authority, "Notification of Transmittal of the International Search Report and the Written Opinion of the International Searching Authority," dated Apr. 30, 2013, in International application No. PCT/US2012/069578.

(56) References Cited

OTHER PUBLICATIONS

Taiwan Patent Office, Office Action dated Aug. 25, 2014, in Taiwan Apllication No. 101141477.
China Patent Office, Office Action dated Oct. 28, 2015 in Chinese Patent Application No. 201280061735.4.
State Intellectual Property Office of the People's Republic of China, Third Office Action dated Nov. 15, 2016 in Chinese Patent Application No. 201280061735.4.

* cited by examiner

| Feature | Performance | Balanced Performance | Balanced Power | Power Saver |
|---|---|---|---|---|
| Feature 1.Setting 0 | Value | Value | Value | Value |
| Feature 1.Setting 1 | Value | Value | Value | Value |
| Feature 2.Setting 0 | Value | Value | Value | Value |
| . | . | . | . | . |
| . | . | . | . | . |
| Feature n.Setting 0 | . | . | . | . |
| . | . | . | . | . |
| Feature n.Setting m | | | | |

FIG. 2

USER LEVEL CONTROL OF POWER MANAGEMENT POLICIES

BACKGROUND

This application is a continuation of U.S. patent application Ser. No. 14/855,553, filed Sep. 16, 2015, now U.S. Pat. No. 9,535,487, issued Jan. 3, 2017, which is a continuation of U.S. patent application Ser. No. 13/782,473, filed Mar. 1, 2013, now U.S. Pat. No. 9,170,624, issued Oct. 27, 2015, which is a continuation of U.S. patent application Ser. No. 13/326,586, filed Dec. 15, 2011, now U.S. Pat. No. 9,098,261, issued Aug. 4, 2015, the content of which is hereby incorporated by reference.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to biotechnology).

In many computing environments, it is an established fact that for much of the time, computing systems such as servers are operating well below their peak performance level. During these periods of low utilization the focus is on saving as much power as possible in order to reduce the energy costs. Power management technologies can deliver significant power savings during periods of low utilization. However any power management technology involves a power/performance tradeoff.

Due to increasing integration, many processors can include power management technologies which can control up ⅔ rds of total platform power. In many cases these technologies are controlled by a power control unit (PCU) in the processor. Each power management feature is specifically tuned in design to achieve an optimal power/performance tradeoff. At the time of tuning, there is little knowledge of the actual workload and usage pattern for the system in the field. Given this lack of knowledge, the tuning process is conservative and is necessarily biased towards losing as little performance as possible. This approach prevents significant power savings for an end user who is willing to tolerate more performance loss in return for power savings.

Thus typically power management features are statically tuned to tolerate very little performance loss. This results in several negative downsides. First, at low utilizations where an end user can tolerate high performance loss, available power savings are not realized. Second, an end user typically has no choice regarding power/performance tradeoffs, other than default profiles provided by an operating system (OS). Given the complexity involved in tuning power management features, end users rarely venture into tuning individual features for their target usage, and thus the potential benefit of the features are often not realized.

BRIEF DESCRIPTION OF THE DRAWINGS

FIG. 2 is a block diagram of a tuning table in accordance with an embodiment of the present invention.

DETAILED DESCRIPTION

Figure 1:
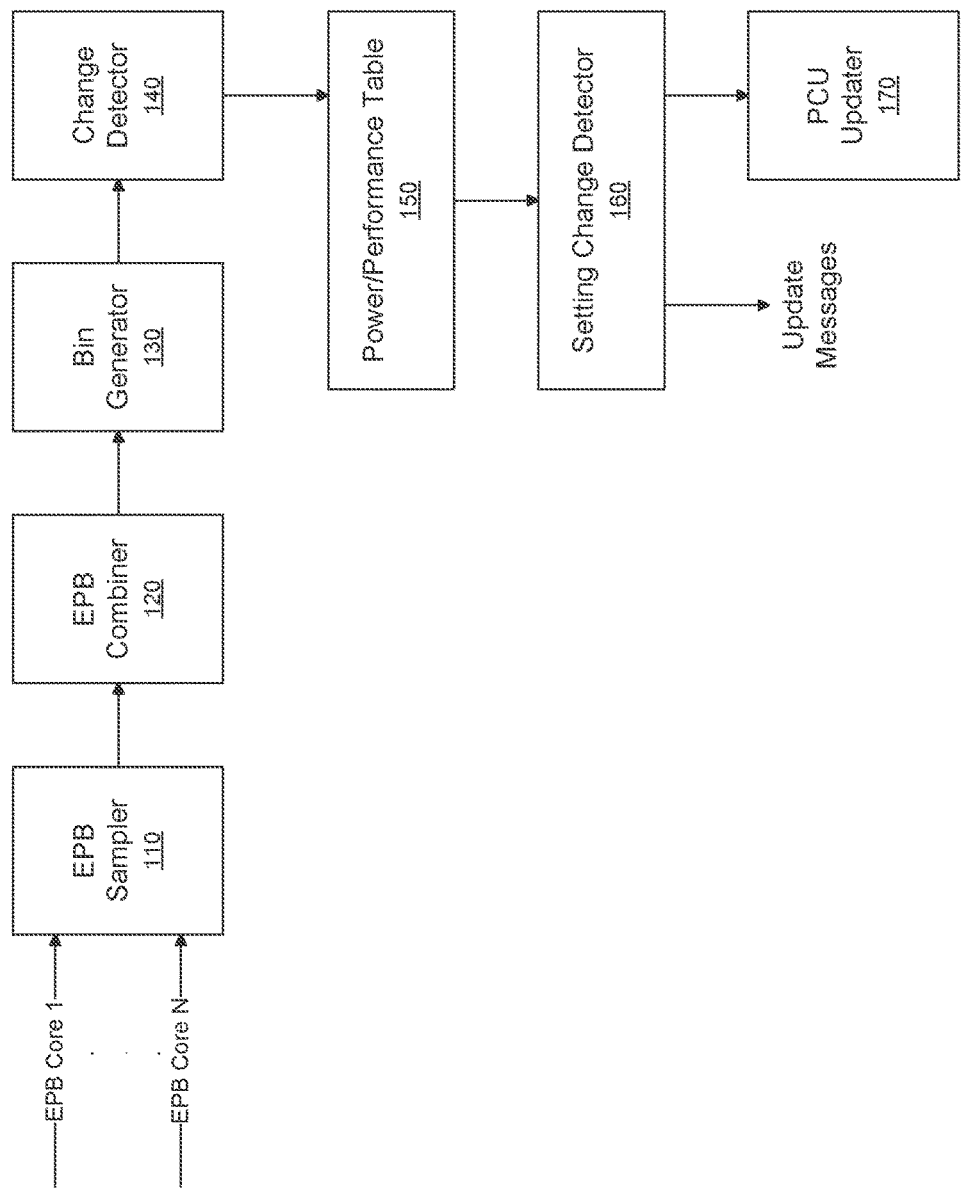
FIG. 1 is a block diagram of an architecture of a tuning circuit for a tunable power performance loadline technique in accordance with one embodiment of the present invention.

Embodiments provide a so-called energy performance bias (EPB) as an architectural feature. Control of this parameter allows for a simple high level input from an end user to indicate a power/performance tradeoff preference from the end user. This input can be used to provide multiple tuning levels with different points of power and performance tradeoff. By associating this energy performance bias with direct user input, embodiments enable the end user to directly control power/performance tradeoff in a simple manner. As used herein the terms "end user" or "user" are comprehended to include computer users of varying degrees, including technical and non-technical users, information technology (IT) personnel, data center personnel and so forth.

Thus instead of providing complete tuning flexibility for each power management technology and allowing an end user to tune each feature, a single input can be provided by the user to control these different features. The EPB value may thus correspond to a single input value to control a plurality of power management features. Furthermore, understand that the provision of the EPB value can be from a variety of external entities including but not limited to an operating system (OS), a basic input/output system (BIOS), an external embedded controller of a platform such as a baseboard management controller (BMC), a data center central management software and communicated via a network and a node manager device or so forth to a platform, among others, automatically or via a user. And in some embodiments, the end user may be prevented from such individual control. As such, the inherent difficulty in exposing all of a large number of power management features to the end user can be avoided, particularly as most end users have little or no knowledge as to how to tune such individual features. In practice, 90% of server users never change the default power management configuration for the server, and a very similar dilemma exists in client usage models as well.

Table 1 below shows a list of power management features available in different processor models and which can be controlled globally using one or more EPB inputs in accordance with an embodiment of the present invention. It can be seen from Table 1 that the number features is disparate and large. This list continues to grow with each generation of processor. As seen, power management features can be performed within a processor itself, a memory or memory interconnect, or other interconnect structures. Embodiments can provide for global control of a plurality of power management features of a processor including, in some embodiments, those shown in Table 1. However, understand that this listing is exemplary only, and other power management features can be controlled using an EPB value in accordance with an embodiment of the present invention.

TABLE 1

| Index | Platform Area | Processor 1 | Processor 2 | Processor 3 |
|---|---|---|---|---|
| 1 | CPU | Turbo | Turbo | Turbo |
| 2 | CPU | C-State Demotion | C-State Demotion | C-State Demotion |
| 3 | Memory | CKE | CKE | CKE |
| 4 | CPU | QPI Los | Not Supported | QPI LOs |
| 5 | CPU | Not Supported | Turbo Demotion | Turbo Demotion |
| 6 | CPU | Not Supported | C-State Undemotion | C-State Undemotion |
| 7 | CPU | Not Supported | Not Supported | Turbo Upside Control |
| 8 | CPU | Not Supported | Energy Efficient Turbo | Not Supported |
| 9 | Memory | Not Supported | Not Supported | CKE Slow |
| 10 | Memory | Not Supported | Not Supported | Opportunistic Self Refresh |
| 11 | CPU | Not Supported | Not Supported | QPI LOP |
| 11 | CPU/PCI | Not Supported | PCIE LOs | PCIE LOs |

A power/performance loadline is a well accepted representation of power consumption of a system at different utilizations. This loadline represents the power consumed at each delivered performance level and takes into account the performance impact of a power management feature. Via an energy performance bias setting in accordance with an embodiment of the present invention, tuning of a power performance loadline can be realized. This setting or slider thus allows an end user to choose a range of choices between performance-oriented tuning settings and power saving-oriented tuning settings. Each EPB value can be mapped to a corresponding level of tradeoff between power and performance.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of an architecture of a tuning circuit for a tunable power performance loadline technique in accordance with an embodiment of the present invention. In the embodiment of FIG. 1, each logical thread can provide an input, namely an energy performance bias value, referred to herein as an EPB value. Note that this logical thread can correspond to a logical processor or other execution entity. The policy choice between performance and power can be provided per logical thread via a register or other storage, e.g., a 4-bit input register. In this example, 16 levels of power and performance tradeoff can be realized, in such an embodiment. According to one convention, a value of zero represents a very low (or even zero) tolerance for performance loss while saving power. On the other hand a value of 15 represents a high tolerance for performance loss and saving as much power as possible. Note that this EPB input can be provided by an operating system (OS) or by system basic input/output system (BIOS), or even by a user level application directly or indirectly.

In one usage model, where an operating system supports multiple power/performance profiles, the OS configures the energy performance bias register to an appropriate value based the power/performance profile chosen by an administrator which is one example of an end user. To this end, embodiments may provide a user interface to request and receive user selection of a given EPB value. This user interface functionality can be accommodated within BIOS or an OS or other custom system level software. In an advanced usage model, a data center administrator or other information technology personnel can provide the input based on time of day policies. For example, during times of peak usage, the administrator can choose to configure a value of 0 while during non-peak hours the administrator can choose to configure the server to a value of 15 to save as much power as possible.

In another usage model for advanced application level control that supports the option for application monitoring of the level of performance that the application expects to receive under a level of service agreement, the application may tune through an OS service the level of performance loss that is acceptable by the application under its current level of operation.

As seen in FIG. 1, a power management tuning circuit 100 can be used to receive incoming EPB values from multiple cores of a multicore processor and use these values to determine an appropriate tradeoff between power and performance policies and provide settings to the agents responsible for controlling various power management features of a system including the processor. In one embodiment, circuit 100 can be implemented in logic of a power control unit (PCU) of a processor, although embodiments can be implemented in other hardware or software. As seen, circuit 100 includes a sampler 110 that can receive incoming EPB values from the various cores. Note that these values received can be from logical threads, in one embodiment, which provide a value based on its programming. Although described in the embodiment of FIG. 1 as being received from cores, in various embodiments, EPB values can be per core's thread, per core or per package that includes a number of cores, or other granularity. By these multiple inputs, thread specific optimizations can be made based on a workload being executed. Received EPB values can be stored in temporary storage, e.g., registers within EPB sampler 110 at a sampling point, which may be according to a given interval. In one embodiment, the EPB inputs can be sampled at a predetermined interval, e.g., once every 1 millisecond (ms). The samples obtained from the various cores can be provided to an EPB combiner 120 that can generate a single value from these multiple values. For power management optimizations that are not thread specific (for example, of a memory controller, interconnect, memory or so forth), a mechanism can be provided to resolve the inputs from the multiple threads. In one embodiment, this resolution can be via a policy of favoring performance. To this end, a min function can be performed on all thread's inputs and the resulting value represents the most performance favoring EPB input. This value can then be used to determine the processor power/performance policy level. However, understand the scope of the present invention is not limited in this way. As an example instead of a minimum function, an averaging between the individual thread values can be performed. Another example is to make the minimum function per control power domain that may hold several sets of cores or threads.

Still referring to FIG. 1, the single value corresponding to, e.g., the minimum value of the EPB value, can be provided to a bin generator 130. Note that in various embodiments this bin generator may be optional to provide for finer-grained control. That is, bin generator 130 may generalize the tuning by taking the received EPB value and placing it into one of multiple bins that correspond to multiple coarser-grained levels of control such that the EPB value thus determined can be bucketed into an internal value. As described above, with a 4-bit EPB value, 16 levels can be provided. However, some systems may not be sufficiently complex with regard to the number of power management features, and thus the determined EPB value can be corresponded to one of N bins less than 16 individual levels. In one embodiment, to simplify and minimize the amount of tuning for a processor, the EPB value can be allocated to one of N buckets or bins. N can equal four, in one embodiment. In this example, each bucket represents a continuous range that is ¼th of total power management range. These buckets may directly map to power/performance profiles supported by certain operating systems. Table 2 shows the tuning criterion for four buckets in accordance with one embodiment of the present invention. However, understand that different tuning criteria can be used in other embodiments.

TABLE 2

| Resolved EPB Input Range | Power Profile | Power Management Feature Tuning Target |
|---|---|---|
| 0-3 | Performance | Tolerate up to 0.1% performance loss |
| 4-7 | Balanced Performance | Tolerate up to 2% performance loss. Power saving should be at least 2x performance loss. |

TABLE 2-continued

| Resolved EPB Input Range | Power Profile | Power Management Feature Tuning Target |
|---|---|---|
| 8-11 | Balanced Power | Tolerate up to 5% performance loss. Power saving should be at least 1x performance loss. |
| 12-15 | Power Saver | Tolerate >5% performance loss. Save as much power as possible. |

Still referring to FIG. 1, the bin value thus determined can be provided to a change detector 140 that can determine whether the value of the bin has changed since the last analysis interval. If not, no further operation of circuit 100 may be performed for that analysis interval. If instead the value has changed, this new value can be used to access a power/performance table 150. In various embodiments, this table can be stored in a processor, e.g., in non-volatile storage of the PCU. The table can be pre-tuned to provide user transparent tuning settings that correspond to a selected power/performance profile. In general, table 150 can include one or more entries for each power management feature. Each entry can further include a plurality of fields, each associated with one of the buckets (or indicated EPB values) to store a parameter for use in that feature or setting of a feature. These parameters may be values used for a certain power management feature, or can be an address to code that is executed for a given setting.

Referring now to FIG. 2, shown is a block diagram of a tuning table in accordance with an embodiment of the present invention. As shown in FIG. 2, table 150 includes multiple entries $151_0$-$151_n$. As seen, each of these entries can be associated with a given power management feature setting. Some features may have more than one setting associated with them. For other power management features, only an entry for a single setting is provided.

As further seen in table 150, each entry includes a plurality of fields. In the embodiment shown in FIG. 2, fields 152, 154, 156 and 158 are provided. Each field is associated with a given one of the multiple bins as discussed above, namely a given policy. In other embodiments, each field can be associated with a given EPB value. Thus for each power management feature setting, every bin can have a value in its corresponding field. In specific implementations, each field may include a value that can be used to control enablement of a power management feature, provide a configuration register value or so forth. For some features and settings, it is possible that multiple bins may have the same value, however the scope of the present invention is not limited in this aspect.

Based on the bin value, a respective column of the table can be accessed and all of the fields of the accessed column can be read out, e.g., as a single vector read or iteratively via a field of an entry per cycle. As will be discussed below, these values output from the table can be provided to a change detector 160. Although shown at this high level in the embodiment of FIG. 3, understand the scope of the present invention is not limited in this regard.

In some embodiments, in addition to the EPB input, a workload configuration input can be provided. To this end, the table can have 3 dimensions such that based on the workload configuration input, a different set of entries for the defined power management features can be accessed, as different values may be present in the table for different workload configurations. By this workload configuration input a vertical user having an understanding and control of the exact workloads running on their systems can benefit from well-tuned settings. As examples, a user can configure a workload input as non-uniform memory architecture (NUMA), uniform memory architecture (UMA), input/output (I/O) intensive, etc. This input allows for choosing tuning settings that favor a specific workload pattern. For example, if the workload is NUMA, aggressive settings can be applied to off-chip interconnects such as Intel® Quick Path Interconnect (QPI) links to save as much power possible while causing very little performance impact, as off-chip accesses can be expected to be low. Thus for embodiments in which a workload configuration input is provided, it can be used as an additional input to access the table.

Once a new set of configurations is determined from access to the tuning table, the target features can be updated. There are two classes of configurations. For features like a power C-state auto demotion and turbo upside clipping, the configurations can be internal to power management code, such as present in firmware of the PCU. In this case the update can be effected by loading new values into an internal feature specific data structure such as one or more configuration registers. In a second class of configuration, the configuration value is specific to an entity that resides outside the PCU. For example, a clock related configuration can be implemented in the memory controller. In this case, the PCU can initiate a series of writes to target configuration space to update the settings. In order to minimize the number of writes, each configuration value can be compared to the previous value and a write is issued only if the actual configuration value changes.

Accordingly, with further reference back to FIG. 1 the identified field of the multiple entries of table 150 can be output to a change detector 160 to determine whether the values have changed from the previous output. Note that for certain power management features, settings may not change when a bin changes level. Thus change detector 160 acts as a filter to filter from sending messages for updates when in fact no update is needed. If a change in fact has occurred, it may be sent from change detector 160 to the indicated destination. As described, many power management features can be controlled using the PCU, and accordingly updated settings can be sent to a PCU updater 170 which thus may update the settings, e.g., by updating values in configuration registers, other storages, enabling or disabling certain power management features, changing variables used with regard to duration of power management features or so forth.

If instead the power management feature is for a non-PCU controlled feature, update messages can be sent to the destination, e.g., via one or more write messages including the information. Although shown with this particular implementation in the embodiment of FIG. 1, understand the scope of the present invention is not limited in this regard.

Figure 3:
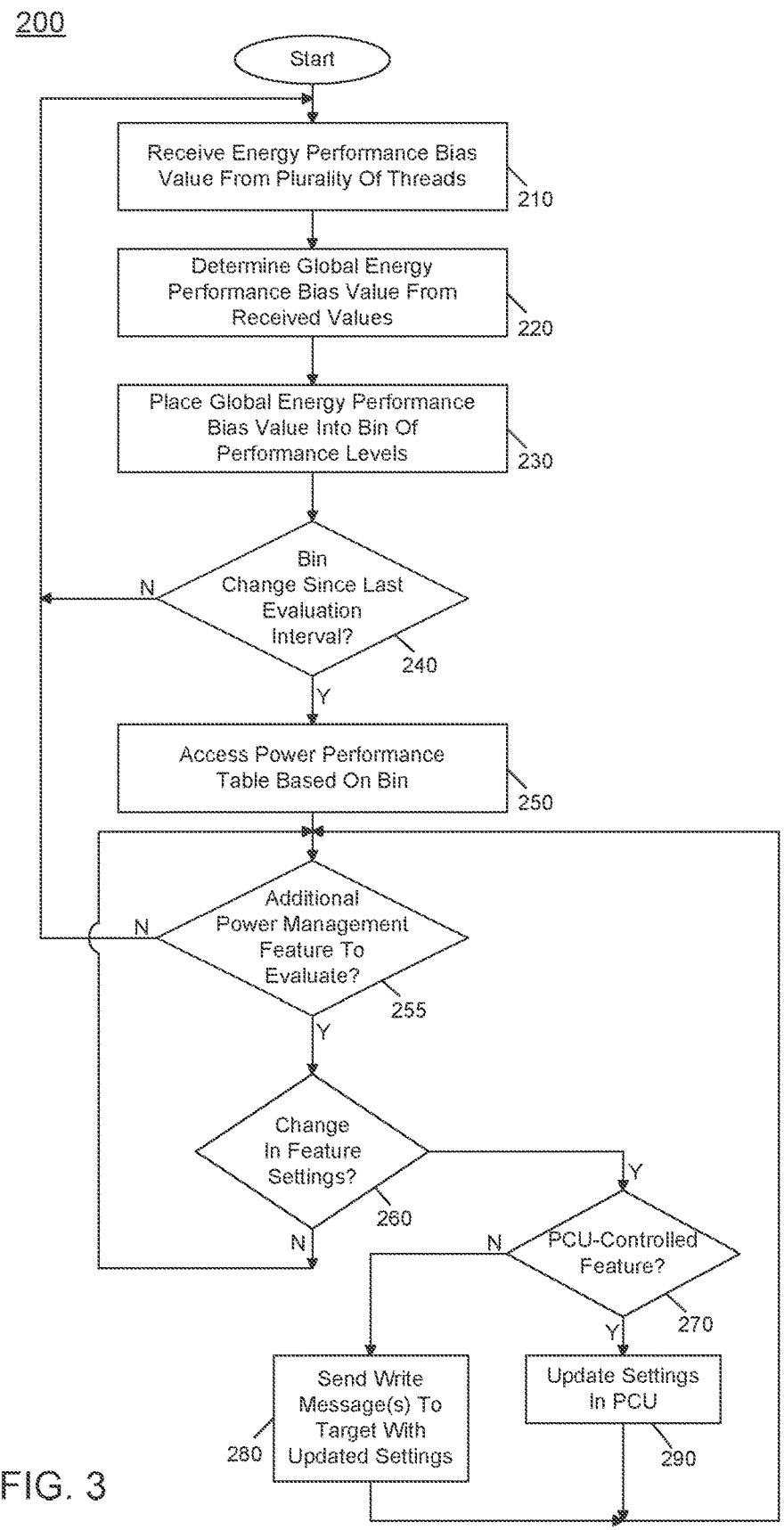
FIG. 3 is a flow diagram of a method in accordance with an embodiment of the present invention.

Referring now to FIG. 3, shown is a flow diagram of a method in accordance with an embodiment of the present invention. As seen, method 200 can be performed, e.g., using policy management logic of a PCU or other power controller. Method 200 begins by receiving an energy performance bias value from multiple threads (block 210). As discussed above, these threads can be logical threads or equivalently the EPB values can be received from the cores themselves. Next, a global EPB value can be determined from the received EPB values (block 220). For example, a min function can be performed or an average obtained from these multiple values. Then, this global EPB value can be placed into a bin of multiple performance level bins (block 230). Such binning provides a smoothing function, although it may not be present in some implementations where very fine-grained control of power and performance tradeoffs is desired.

Still referring to FIG. 3, control next passes to diamond 240 where it can be determined whether a bin change has occurred since the last evaluation interval. If not, method 200 concludes for that given evaluation interval which can be, e.g., on the order of approximately 1 ms.

If instead a bin change has occurred, control passes to block 250 where a power-performance table can be accessed based on the bin. This table access thus can be used to read out for the given bin, and for each of multiple power management features, one or more settings or other values used to control the power management feature. This reading and the updating process can be performed iteratively for each feature. Thus it can be determined whether an additional power management features present in the table (diamond 255). If not, method 200 terminates for that evaluation interval. If another feature is present, it can be determined whether a change in the feature settings has occurred since the last read out from the table (diamond 260). If not control passes back to diamond 255. If instead a feature change has occurred, control passes to diamond 270 where it can be determined whether the feature is a PCU-controlled feature. If so, one or more settings for the feature can be updated in the PCU (block 290). Such updating can be via configuration register updates or so forth. Otherwise if the updates are for a power management feature controlled by an external agent, control passes to block 280 where one or more messages, e.g., write messages can be sent to the destination agent to update the settings accordingly. For example, writes can be issued to target using a given message channel (e.g., QPI, integrated memory controller, a Peripheral Component Interconnect Express (PCI Express™ (PCIe™)) link or so forth). Although shown with this particular implementation in the embodiment of FIG. 3, understand the scope of the present invention is not limited in this regard.

In one embodiment, a tuning methodology for generating to power-performance table may include the following. First, each individual power management feature is tuned separately while the other features are turned off. This tuning includes generating a power/performance profile across a range of workloads for each feature. As an example various benchmark workloads can be executed to generate the profile. Second, multiple features can be enabled to a profile whether the power/performance tradeoff met the tuning goals for overall power/performance profile. Then individual feature tunings can be adjusted to meet overall power/performance profile goals. The above steps can be repeated until overall goals are reached.

By default the operating system may populate the EPB input with a profile chosen by the end user. This tuning can be achieved via an iterative process in which different EPB values are input and workloads run with each setting. As the EPB input is tuned towards power savings, a user may notice a continuous degradation of response time (performance). Once a desired response time is met, the EPB value may correspond to a desired maximum power savings for the user's specific usage. This in essence is the goal of the tunable power performance loadline, as each end user can tune the power/performance loadline to his specific usage.

Figure 4:
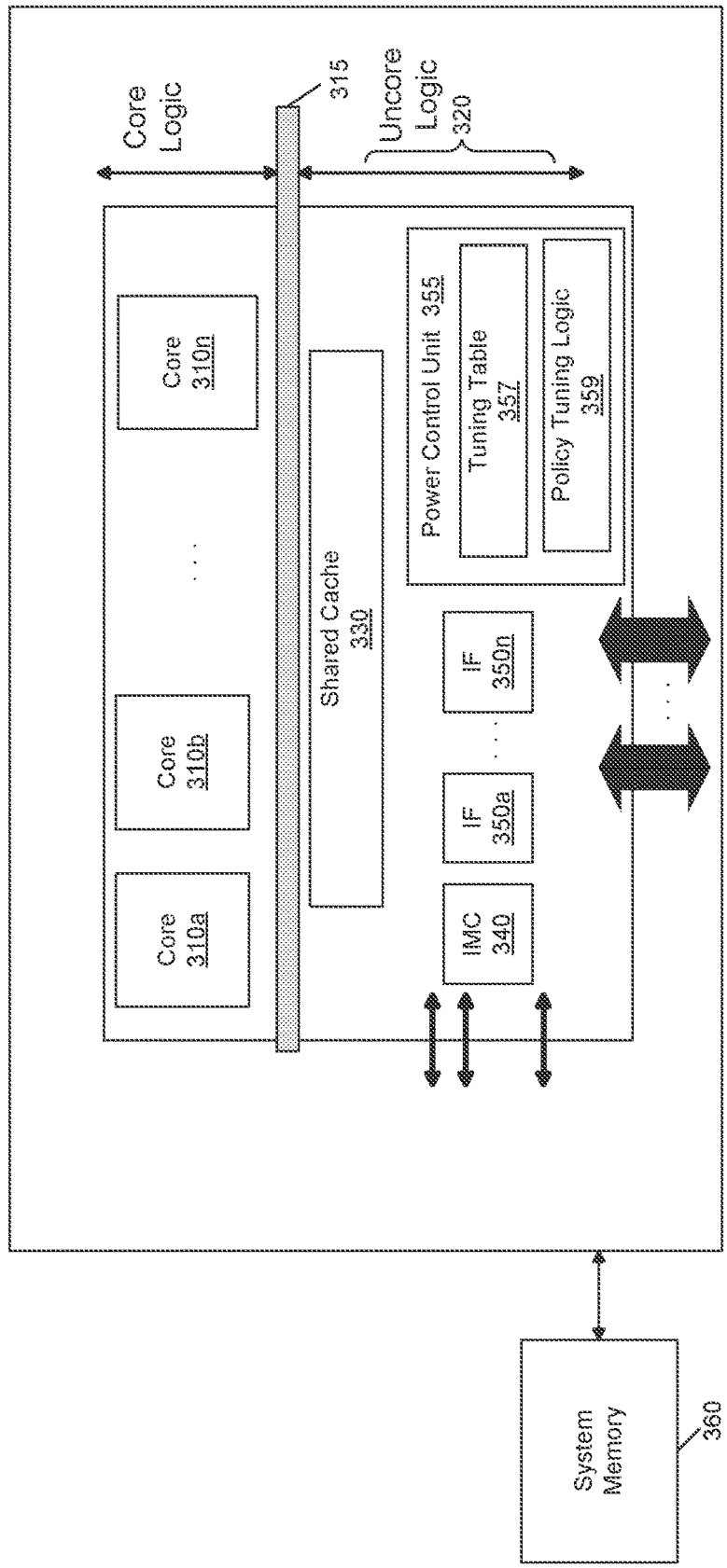
FIG. 4 is a block diagram of a processor in accordance with an embodiment of the present invention.

Embodiments can be implemented in processors for various markets including server processors, desktop processors, mobile processors, and so forth. Referring now to FIG. 4, shown is a block diagram of a processor in accordance with an embodiment of the present invention. As shown in FIG. 4, processor 300 may be a multicore processor including a plurality of cores $310_a$-$310_n$. In one embodiment, each such core may be of an independent power domain and can be configured to operate at an independent voltage and/or frequency, and to enter turbo mode when available headroom exists. The various cores may be coupled via an interconnect 315 to a system agent or uncore 320 that includes various components. As seen, the uncore 320 may include a shared cache 330 which may be a last level cache. In addition, the uncore may include an integrated memory controller 340, various interfaces 350 and a power control unit 355.

In various embodiments, power control unit 355 may include a policy tuning logic 359, which may be a logic to perform dynamic control of power management settings based on an input EPB value. As further seen, a tuning table 357 can be present to store power management feature settings. This tuning table generated, e.g., during design of the processor, based on benchmark workload testing on the processor may be used to determine appropriate settings for the different power management policies that map to EPB values or bins.

With further reference to FIG. 4, processor 300 may communicate with a system memory 360, e.g., via a memory bus. In addition, by interfaces 350, connection can be made to various off-chip components such as peripheral devices, mass storage and so forth. While shown with this particular implementation in the embodiment of FIG. 4, the scope of the present invention is not limited in this regard.

Figure 5:
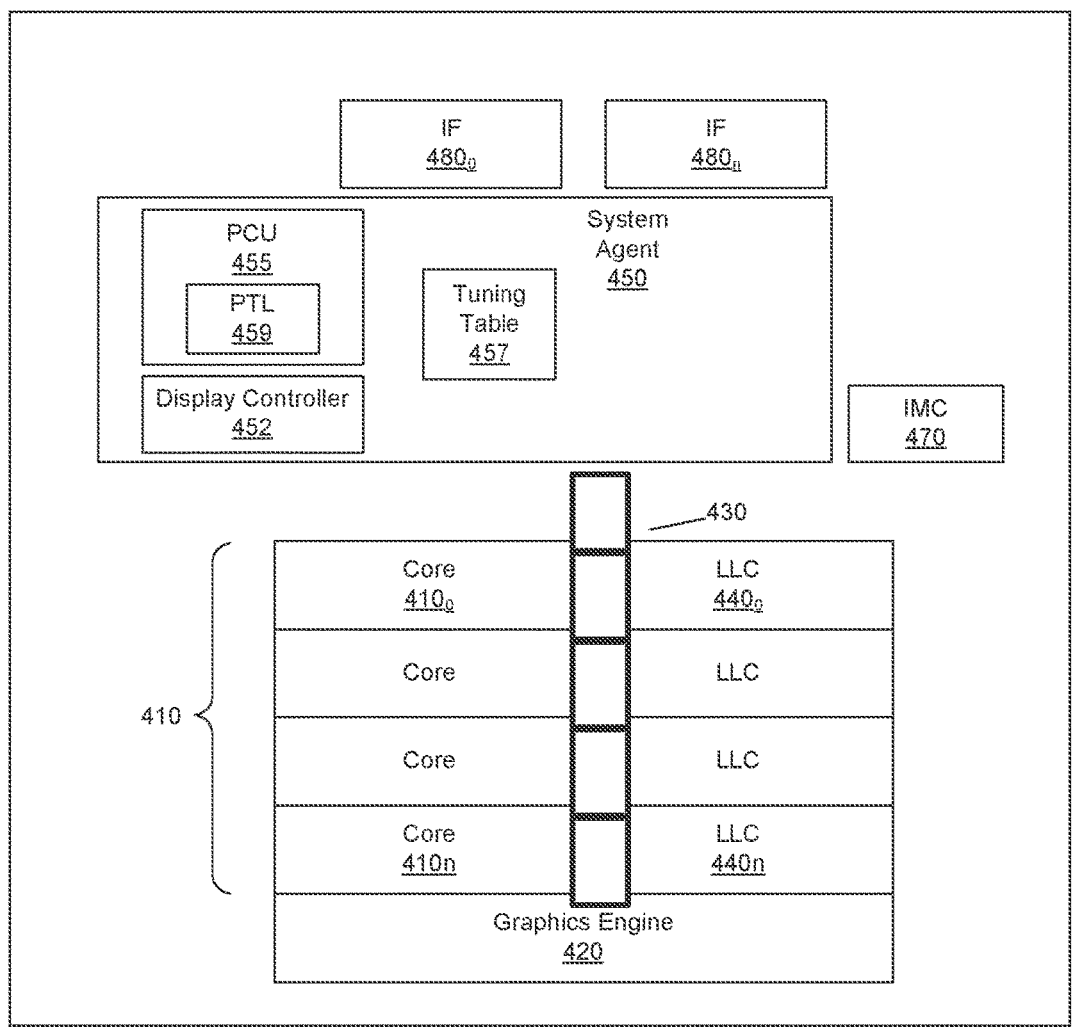
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 400 includes multiple domains. Specifically, a core domain 410 can include a plurality of cores $410_0$-$410n$, a graphics domain 420 can include one or more graphics engines, and a system agent domain 450 may further be present. In various embodiments, system agent domain 450 may execute at a fixed frequency and may remain powered on at all times to handle power control events and power management such that domains 410 and 420 can be controlled to dynamically enter into and exit low power states. Each of domains 410 and 420 may operate at different voltage and/or power. Note that while only shown with three domains, understand the scope of the present invention is not limited in this regard and additional domains can be present in other embodiments. For example, multiple core domains may be present each including at least one core.

In general, each core 410 may further include low level caches in addition to various execution units and additional processing elements. In turn, the various cores may be coupled to each other and to a shared cache memory formed of a plurality of units of a last level cache (LLC) $440_0$-$440_n$. In various embodiments, LLC 440 may be shared amongst the cores and the graphics engine, as well as various media processing circuitry. As seen, a ring interconnect 430 thus couples the cores together, and provides interconnection between the cores, graphics domain 420 and system agent circuitry 450. In one embodiment, interconnect 430 can be part of the core domain. However in other embodiments the ring interconnect can be of its own domain.

As further seen, system agent domain 450 may include a display controller 452 which may provide control of and an interface to an associated display. As further seen, system agent domain 450 may include a power control unit 455 which can include a policy tuning logic 459 in accordance with an embodiment of the present invention to dynamically control power management settings obtained from a tuning table 457 based on one or more EPB values. In various embodiments, this logic may execute the algorithm described above in FIG. 3.

As further seen in FIG. 5, processor 400 can further include an integrated memory controller (IMC) 470 that can provide for an interface to a system memory, such as a dynamic random access memory (DRAM). Multiple interfaces $480_0$-$480_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with a Intel® Quick Path Interconnect (QPI) protocol may also be provided. Although shown at this high level in the embodiment of FIG. 5, understand the scope of the present invention is not limited in this regard.

Figure 6:
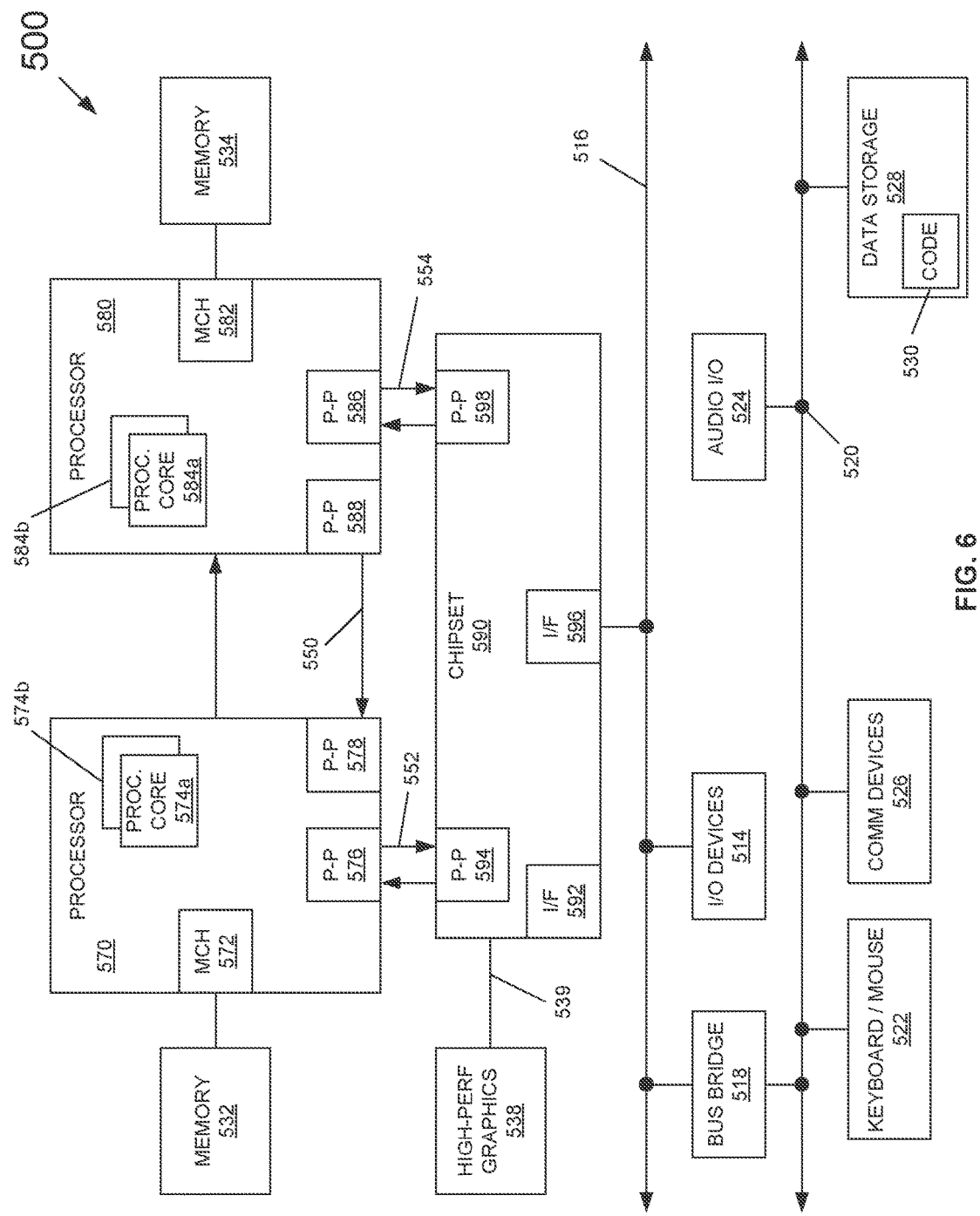
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 500 is a point-to-point interconnect system, and includes a first processor 570 and a second processor 580 coupled via a point-to-point interconnect 550. As shown in FIG. 6, each of processors 570 and 580 may be multicore processors, including first and second processor cores (i.e., processor cores 574a and 574b and processor cores 584a and 584b), although potentially many more cores may be present in the processors. Each of the processors can include a PCU or other logic to perform dynamic control of power management settings based on a resolved power management policy, as described herein.

Still referring to FIG. 6, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 6, MCH's 572 and 582 couple the processors to respective memories, namely a memory 532 and a memory 534, which may be portions of system memory (e.g., DRAM) locally attached to the respective processors. First processor 570 and second processor 580 may be coupled to a chipset 590 via P-P interconnects 552 and 554, respectively. As shown in FIG. 6, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 6, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Embodiments can be incorporated into other types of systems including mobile devices such as a smart cellular telephone, tablet computer, netbook, ultrabook, or so forth.

Figure 7:
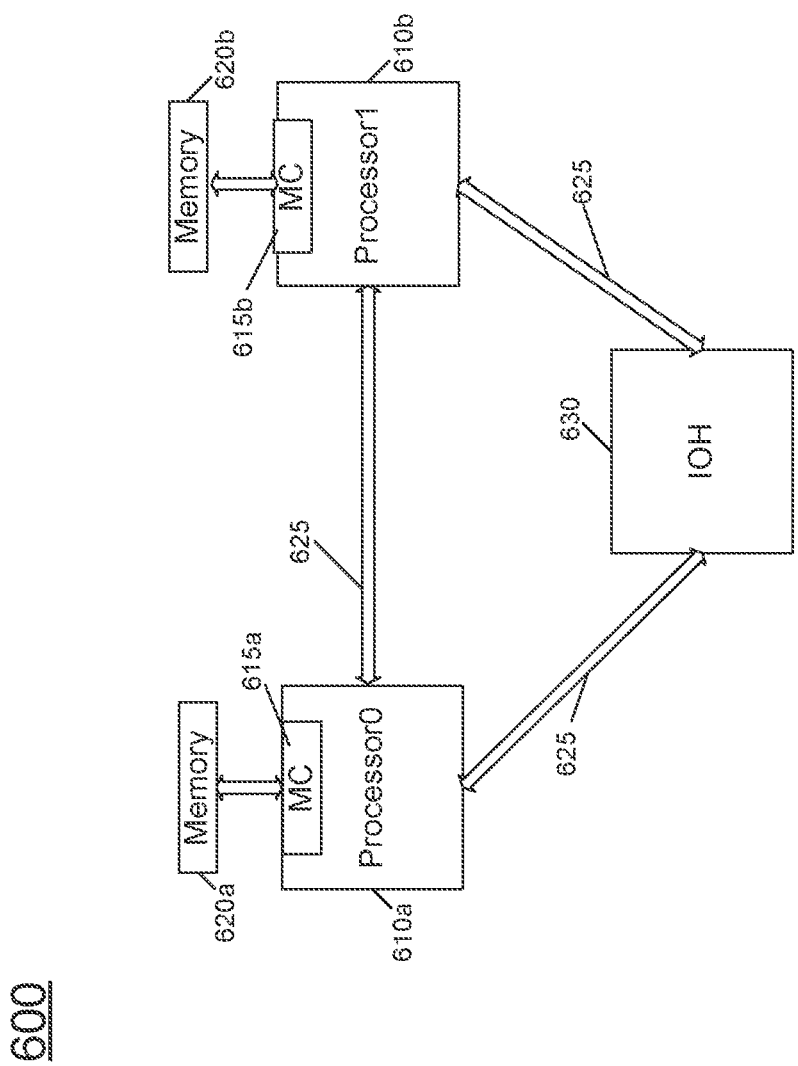
FIG. 7 is a block diagram of a multiprocessor system with a point-to-point (PtP) interconnect in accordance with one embodiment of the present invention.

FIG. 7 is a block diagram of a system 600 coupled with point-to-point (PtP) system interconnects in accordance with a given cache coherence protocol using QPI links as the system interconnect. In the embodiment shown, each processor 610 is coupled to two PtP links 625 and includes one instance of an integrated memory controller 615 that in turn is coupled to a corresponding local portion of a system memory 620. Each processor can perform power management techniques using optimized settings obtained from a tuning table in accordance with an embodiment of the present invention. The processors are connected to an input/output hub (IOH) 630 using one link and the remaining link is used to connect the two processors.

Figure 8:
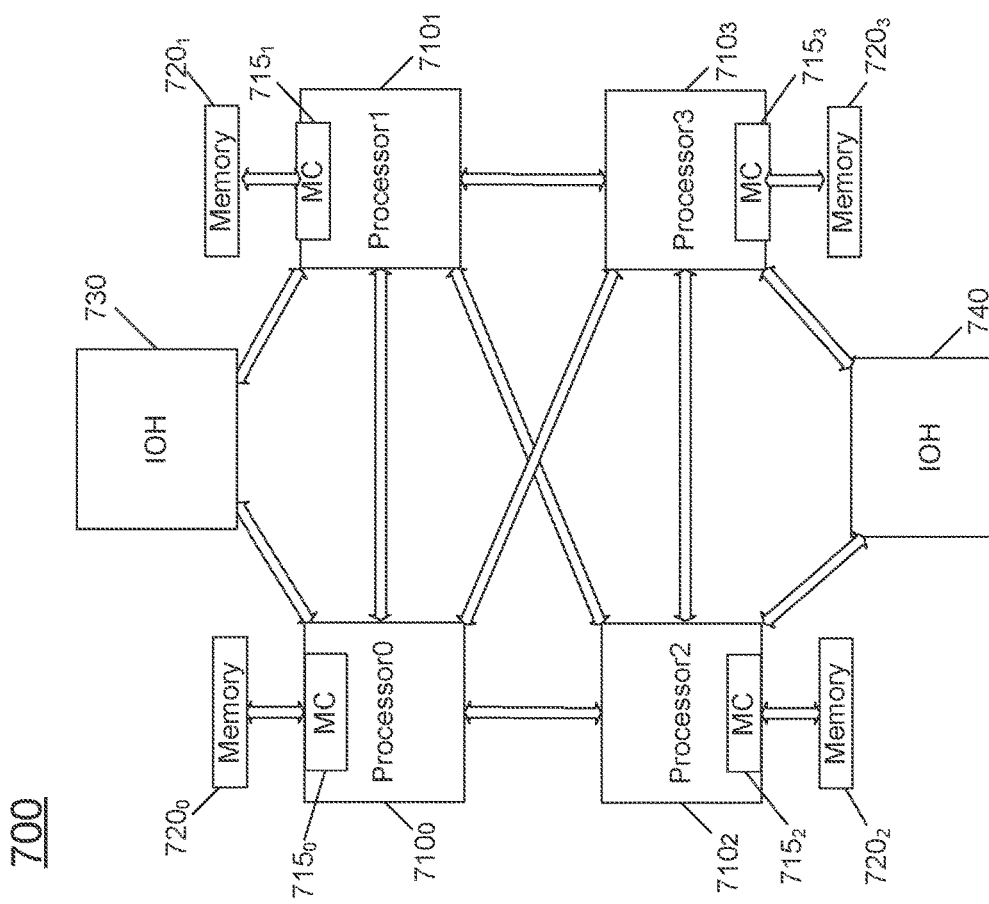
FIG. 8 is a block diagram of a partially connected quad processor system in accordance with one embodiment of the present invention.

Referring now to FIG. 8, shown is a block diagram of a system in accordance with another embodiment of the present invention. As shown in FIG. 8, system 700 may be a partially connected quad processor system in which each processor 710 (each of which may be multicore multi-domain processors) is coupled to each other processor via a PtP link and is coupled to a local portion of memory (e.g., dynamic random access memory (DRAM)) 720 via a memory interconnect coupled to an integrated memory controller 715 of the corresponding processor. In the partially connected system of FIG. 8, note the presence of two IOHs 730 and 740 such that processors 710$_0$ and 710$_1$ are directly coupled to IOH 730 and similarly processors 710$_2$ and 710$_3$ are directly coupled to IOH 740.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of cores;
a cache memory;
an interconnect to couple the plurality of cores and the cache memory; and
a power controller to control a plurality of power management features of the processor, wherein the power controller includes a tuning circuit to receive a workload configuration input regarding a workload, receive a plurality of energy performance bias (EPB) values and determine a global EPB value based thereon, and update at least one setting of at least one of the plurality of power management features based on the workload configuration input and the global EPB value.

2. The processor of claim 1, wherein the power controller is to access a power-performance tuning table based on the workload configuration input and the global EPB value, and use information from the power-performance tuning table to update the at least one setting.

3. The processor of claim 2, wherein the tuning circuit is to update the at least one setting of the at least one power management feature responsive to the global EPB value.

4. The processor of claim 3, wherein the tuning circuit includes a sampler to receive the plurality of EPB values from at least some of the plurality of cores and a combiner to generate the global EPB value from the EPB value from the plurality of cores.

5. The processor of claim 4, wherein the sampler is to receive the EPB value from a plurality of threads to execute on the at least some of the plurality of cores.

6. The processor of claim 4, wherein the power controller is to generate a bin value from the global EPB value and to access the power-performance tuning table using the bin value.

7. The processor of claim 3, wherein the tuning circuit is to update at least one setting of a first power management feature controlled by the power controller, and send a message to an interconnect that couples the processor to a second component of a system to update at least one setting of a second power management feature controlled by the interconnect.

8. The processor of claim 2, wherein the power-performance tuning table includes a plurality of entries each having a plurality of fields each associated with a range of the EPB value and including a setting for a power management feature.

9. The processor of claim 1, wherein the processor is to receive at least one EPB value from a baseboard management controller.

10. The processor of claim 1, wherein the at least one EPB value is to be provided based at least in part on a time of day policy.

11. A non-transitory machine-readable medium having stored thereon instructions, which if performed by a machine cause the machine to perform a method comprising:
receiving an energy performance bias (EPB) value in a tuning circuit of a power control logic of a processor from a plurality of threads executing on the processor and determining a global EPB value based at least in part on the EPB value received from the plurality of threads, the EPB value to indicate a preference of a user for a tradeoff between power optimization and performance optimization;
accessing a table based on the global EPB value; and
updating at least one setting of a power management feature controlled by the power control logic based on information obtained from the table.

12. The non-transitory machine-readable medium of claim 11, wherein the method further comprises selecting a bin of a plurality of bins, each associated with a power-performance profile using the global EPB value.

13. The non-transitory machine-readable medium of claim 11, wherein the method further comprises providing an interface to enable a user, an operating system or a baseboard management controller to set the EPB value, and controlling a plurality of power management features via input of the EPB value.

14. The non-transitory machine-readable medium of claim 11, wherein the method further comprises receiving the EPB value with a first value for a first portion of a day and with a second value for a second portion of the day, wherein the first value is to configure a system for first performance during the first portion of the day corresponding to peak user hours, and the second value to configure the system for higher power savings during the second portion of the day corresponding to non-peak user hours.

15. A system comprising:
- a multicore processor including a plurality of cores, at least one cache memory and a memory controller;
- a tuning circuit to dynamically select a balance between power consumption and performance based on an energy performance bias (EPB) value, wherein the tuning circuit is to access an entry of a tuning table based at least in part on the EPB value and a workload configuration value and update a setting for a power management feature responsive to a value stored in a field of the entry, wherein the workload configuration value is to indicate a predominant workload type to be executed on the system, the tuning table including a first set of entries associated with a first workload type and a second set of entries associated with a second workload type; and
- a system memory coupled to the multicore processor via a memory interconnect.

16. The system of claim 15, wherein the tuning circuit is to update at least one setting of a first power management feature controlled by a power control logic of the multicore processor, the at least one setting obtained from a field of an entry of the tuning table associated with a bin in which the EPB value is included.

17. The system of claim 16, wherein multicore processor comprises the tuning circuit.

18. The system of claim 15, wherein the multicore processor comprises a power control logic, the power control logic comprising the tuning circuit, wherein the tuning circuit is to generate a bin value from the EPB value and access the tuning table using the bin value.

19. The processor of claim 1, wherein the power controller is to enable a first power management feature based on the updated at least one setting.

20. The processor of claim 1, wherein the power controller is to send an update message to a destination agent of the processor to cause the destination agent to control a first power management feature based on the updated at least one setting.

* * * * *